Aug. 13, 1968 P. DOSCH 3,397,317

SELF-REGULATING PHOTOELECTRIC CIRCUIT

Filed Dec. 13, 1965

INVENTOR.
PETER DOSCH
BY
Ward, Haselton, McElhannon, Orme, Brooks & Fitzpatrick
ATTORNEYS

United States Patent Office 3,397,317
Patented Aug. 13, 1968

3,397,317

SELF-REGULATING PHOTOELECTRIC CIRCUIT

Peter Dosch, Jona, Switzerland, assignor to Heberlein & Co. A.G., Wattwil, Switzerland, a corporation of Switzerland Filed Dec. 13, 1965, Ser. No. 513,195
Claims priority, application Switzerland, Dec. 16, 1964, 16,259/64
5 Claims. (Cl. 250—219)

This invention relates to control circuits, and more particularly it concerns a stabilized photoelectric detection circuit for producing amplified output signals proportionally related to percentage changes in light intensity.

The invention is particularly suited for use in connection with electronic yarn cleaners where variations in the cross section of a thread passing between a light source and a photo-sensitive element cause corresponding variations in the illumination of the photo-sensitive element. The amount of this variation is, of course, related to the degree of variation of the thread cross section, i.e., the defect in the thread.

There are additionally many other devices wherein control, regulation or counting is based upon the variation in illumination of a photoelectric element caused by the passage of an opaque substance between a light source and the element. Such other devices include for example automatic door openers, instruments for controlling the surface of liquids, or automatic piece counters on conveyor belts.

One difficulty associated with the use of photoelectric detection systems lies in the fact that the electric current which passes through the photo-sensitive element changes during operation. This occurs as a result of aging of the photo-sensitive element; or it may result from the accumulation of dirt on or by aging of the light source. In order to compensate for this, circuits have been developed which keep the average values of current through the photoelectric element constant by automatic adjustment of the intensity of the light source. Other devices provide for compensatory adjustment of the amplification of the output signal in such a manner that its output signal remains constant.

It has also been proposed to provide a circuit wherein the signal produced corresponds to the logarithm of the intensity of the light illuminating the photoelectric element. In such circuits, however, the logarithmic element had to be connected in series with the light sensitive element; and accordingly was not practical for use with photovoltaic or self generating photocells which convert light energy directly into electrical power. The reason for this is that the voltages generated by known photovoltaic elements are far too low to use with logarithmic devices such as back biased diodes. Photovoltaic elements, however are desirable for they have the advantage of being small, fast reacting, and very sensitive.

In the past attempts have been made to incorporate photovoltaic cells with logarithmic elements by first amplifying the output of the cell and then feeding the amplified signal to the logarithmic element. Such solutions however, have been unsatisfactory for they require amplifiers having linear characteristics in the desired range of operation.

The present invention serves to avoid the above-described difficulties of the prior art. According to the present invention, there is provided a novel electric circuit for producing signals which are proportional to the logarithm. This novel circuit is characterized in that a photovoltaic element is connected between the base and the emitter of a transistor in such manner that it attempts to reverse or back bias the transistor. Further, a logarithmic element is connected between the collector and the base of the transistor, and serves as a feed-back resistance.

In a preferred embodiment, described more fully hereinafter, the voltage arising between the collector and the emitter of the transistor, which is proportional to the logarithm of the intensity of illumination of the photovoltaic cell, is fed to a transistorized amplifier to which a transistor flip-flop stage is connected which responds when the variation of the amplified current exceeds a threshold value to thus energize an electromagnet.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings forming a part of the specification, wherein.

Figure 1:
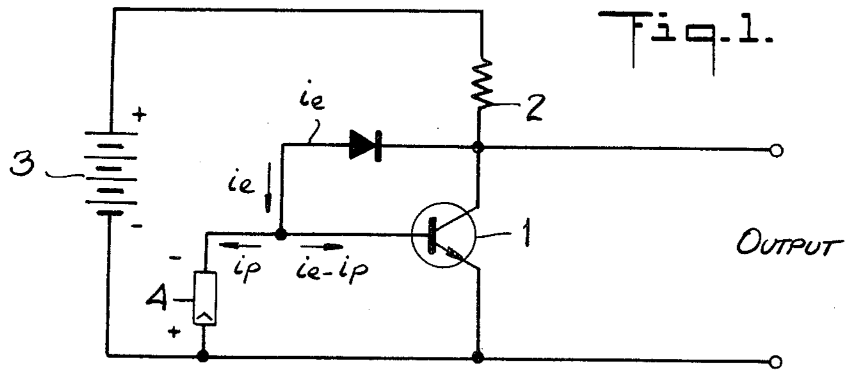
FIG. 1 is a circuit schematic showing one embodiment of the present invention.

As shown in FIG. 1 there is provided a first circuit comprising an NPN type transistor 1 having its emitter-collector path connected in series with a resistor 2 and a source 3 of direct current. There is also provided a second circuit comprising a self generating photovoltaic cell 4 connected across the base-emitter path of the transistor 1. It will be noted that the cell 4 is an active circuit in that it generates its own voltage from incident light energy; and thus requires no external voltage source. The cell 4 is connected such that the voltage it generates attempts to force current in a reverse direction through the base-emitter path of the transistor.

A logarithmic element 5, which may be a reverse connected solid state diode, is connected between the collector and base of the transistor. A small current ($i_e$) normally flows through the element 5 and into the base of the transistor, so that the base becomes positive and the transistor becomes conductive. Now, when light energy becomes incident upon the cell 4, it in turn tends to draw current ($i_p$) out from the base of the transistor. The actual base current is thus the difference current ($i_e—i_p$). This difference current becomes stabilized at a very small value, whereby the logarithmic element 5 operates as feed-back resistance. If the current $i_p$ is increased due to an increase of the intensity of incident light, the difference current ($i_e—i_p$) becomes smaller. This reduces the conductivity of the transistor 1 which in turn opposes the increase of current $i_p$. The voltage drop across the resistor 2 becomes smaller due to decrease of the collector-emitter current through the transistor 1. Correspondingly, the collector-emitter voltage, which also serves as the output voltage, and the current $i_e$ each becomes increased. Due to the logarithmic characteristics of the diode 5 being connected in reverse direction, there results a logarithmic dependence of the output voltage from the intensity of light energy incident upon the cell 4.

It will be appreciated that this circuit permits the use of highly sensitive and highly responsive photo-voltaic cells which are incapable of producing large amounts of power. This is accomplished by supplying relatively high power via the source 3 to the transistor 1 and by using the logarithmic element 5 and the cell 4 to control the operation of the transistor. The present arrangement, it will be noted, is such that except for the shunting characteristics of the transistor 1, the current supplied by the source 3 would flow through the cell 4 and cause its destruction. The transistor 1 however, operates as above described to operate based upon current supplied from the source 3 through the resistor 2; while the net current resulting from that produced by the cell 4 and that flowing through the element 5 operates to control the transistor's operation.

Figure 2:
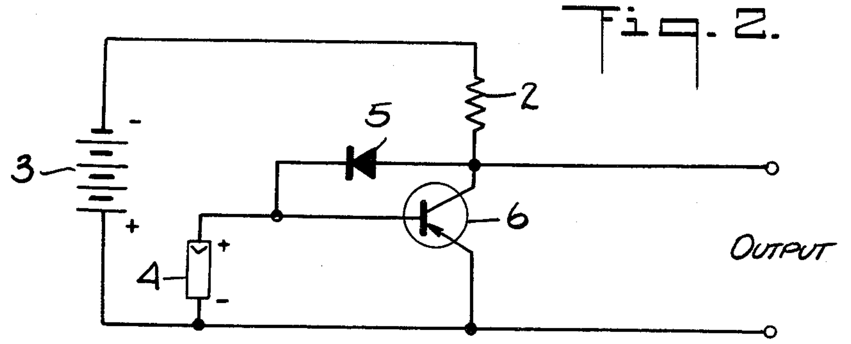
FIG. 2 is another circuit schematic showing a second embodiment of the invention.

Fig. 2 shows a reverse circuit arrangement utilizing a PNP type transistor 6. The operation of this reverse arrangement is basically the same as that of the current of FIG. 1. In the arrangement of FIG. 2, the direct current source 3, the photo-cell 4 and the logarithmic circuit element 5 are connected in their opposite directions.

Figure 3:
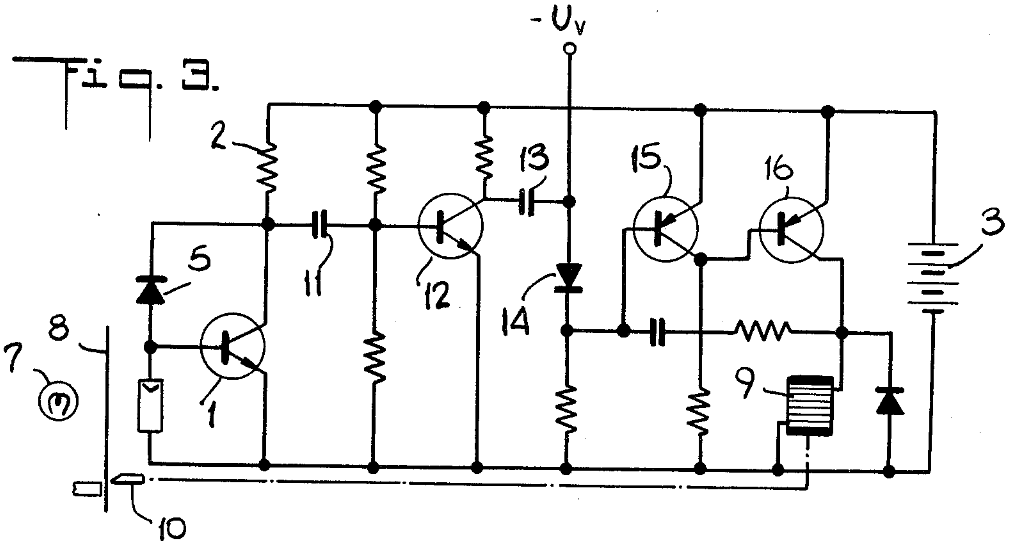
FIG. 3 is a further circuit schematic showing an arrangement according to the invention as adapted to survey a moving thread.

FIG. 3 shows a circuit arrangement for a photoelectric slub catcher according to the present invention. In this arrangement a thread 8 is caused to move along between a light source 7 and the photo-element 4. When the diameter of the thread 8 exceeds a certain threshold value, a solenoid 9 is energized, and this in turn actuates a knife 10 which cuts the thread. The signal level control portion of this arrangement is similar to that of FIG. 1, comprising the transistor 1, the resistor 2, and the logarithmic element 5 connected as above described. These elements of course cooperate in the same manner as they do in FIG. 1. The output of this control portion, which is taken as a voltage across the emitter and collector of the transistor 1, is supplied via a condenser 11 to an amplifying transistor 12. The output from the amplifying transistor is then supplied via a change responsive capacitor 13 to a biased diode 14. A threshold bias voltage-$U_v$ is maintained on the diode 14 so that it permits only voltage changes in excess of a given threshold to pass through the diode. These voltage changes are applied to one side of a conventional monostable multivibrator circuit made up of further transistors 15 and 16. The multivibrator circuit in turn energizes the solenoid 9.

It has been found in actual practice that the above described circuits perform with a high degree of precision and reliability over a wide range of operation. It has also been found that the operating characteristics are to a great extent, independent of the characteristics of the transistor 1.

Although particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In a photoelectric circuit, a transistor having a base terminal, a collector terminal, and an emitter terminal, a photovoltaic cell of the type which generates a voltage according to incident light energy, means connecting said photovoltaic cell between the emitter and base terminals in a direction such that voltages produced by it in response to incident light energy tend to force current in a reverse direction through said transistor, and a logarithmic element connected between the collector and base terminals of said transistor.

2. A circuit according to claim 1 wherein said logarithmic element is a reverse connected solid state diode.

3. A circuit according to claim 2 and including a resistor and a source of direct current connected in series with the emitter and collector terminals of said transistor.

4. A circuit according to claim 3 wherein said photoelectric circuit includes an output portion connected across the emitter and collector terminals of said transistor and arranged to respond to voltage variations in excess of a given threshold.

5. A circuit according to claim 4 wherein there is provided means for running a thread between said photovoltaic cell and a light source directed at said cell and cutting means actuated by said output circuit to cut the thread in the vicinity of said cell.

References Cited

UNITED STATES PATENTS

| | | | |
|---|---|---|---|
| 2,996,621 | 8/1961 | Barrett | 250—202 |
| 3,224,676 | 12/1965 | Rauchwerger | 250—206 X |
| 3,320,430 | 5/1967 | Gorman | 307—885 |

DAVID J. GALVIN, *Primary Examiner.*